(12) United States Patent
Rattenbury et al.

(10) Patent No.: US 8,696,063 B2
(45) Date of Patent: Apr. 15, 2014

(54) PIVOTABLE INFANT CAR SEAT

(75) Inventors: Steven William Rattenbury, Wynnum West (AU); Edward Joseph Khoury, Bateman (AU)

(73) Assignee: Steven Rattenbury, Queensland (AU)

( * ) Notice: Subject to any disclaimer, the term of this patent is extended or adjusted under 35 U.S.C. 154(b) by 19 days.

(21) Appl. No.: 13/519,786

(22) PCT Filed: Dec. 24, 2010

(86) PCT No.: PCT/AU2010/001748
§ 371 (c)(1),
(2), (4) Date: Jul. 5, 2012

(87) PCT Pub. No.: WO2011/079350
PCT Pub. Date: Jul. 7, 2011

(65) Prior Publication Data
US 2012/0267927 A1      Oct. 25, 2012

(30) Foreign Application Priority Data
Jan. 4, 2010    (AU) .................................. 2010900014

(51) Int. Cl.
*B60N 2/26*      (2006.01)
*B60N 2/28*      (2006.01)

(52) U.S. Cl.
USPC ................................... 297/256.12

(58) Field of Classification Search
USPC ...................... 297/216.12, 256.12
See application file for complete search history.

(56) References Cited

U.S. PATENT DOCUMENTS

| 4,643,474 A | 2/1987 | Wise et al. |
| 4,971,392 A | 11/1990 | Young |
| 6,199,949 B1 * | 3/2001 | DaSilva ................... 297/256.12 |
| 6,572,189 B1 * | 6/2003 | Blaymore ................ 297/256.12 |
| 6,739,661 B1 | 5/2004 | Dukes |
| 7,357,451 B2 | 4/2008 | Bendure et al. |
| 7,481,492 B2 | 1/2009 | Lhomme et al. |

OTHER PUBLICATIONS

International Search Report dated Feb. 18, 2011 from corresponding International Patent Application No. PCT/AU2010/001748—3 pages.

* cited by examiner

*Primary Examiner* — Rodney B White
(74) *Attorney, Agent, or Firm* — Maier & Maier, PLLC

(57) ABSTRACT

A car seat including a base unit securable to the seat of a car and a seat unit mounted to the base unit. First and second pivot mechanisms are provided on opposite sides of the car seat. A release mechanism provided on each of the first and second pivot mechanisms to disengage the first portion of the pivot mechanism from the second portion of the pivot mechanism. When the first portion of the first pivot mechanism is disengaged from the second portion of the first pivot mechanism, the seat unit pivots relative to the base unit about the second pivot mechanism. When the first portion of the second pivot mechanism is disengaged from the second portion of the second pivot mechanism, the seat unit pivots relative to the base unit about the first pivot mechanism.

13 Claims, 8 Drawing Sheets

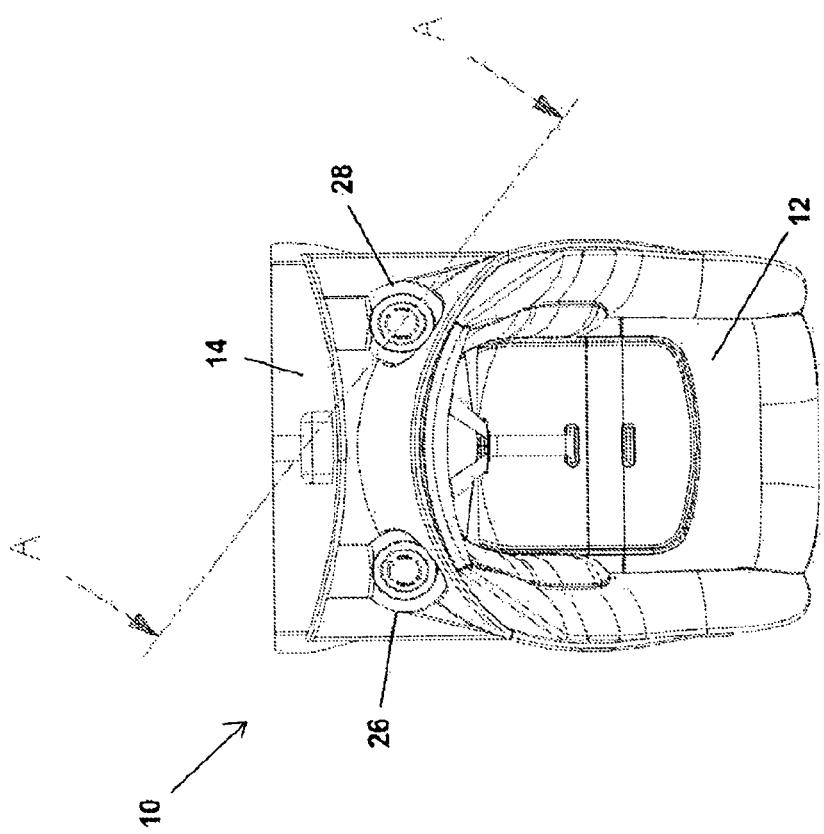
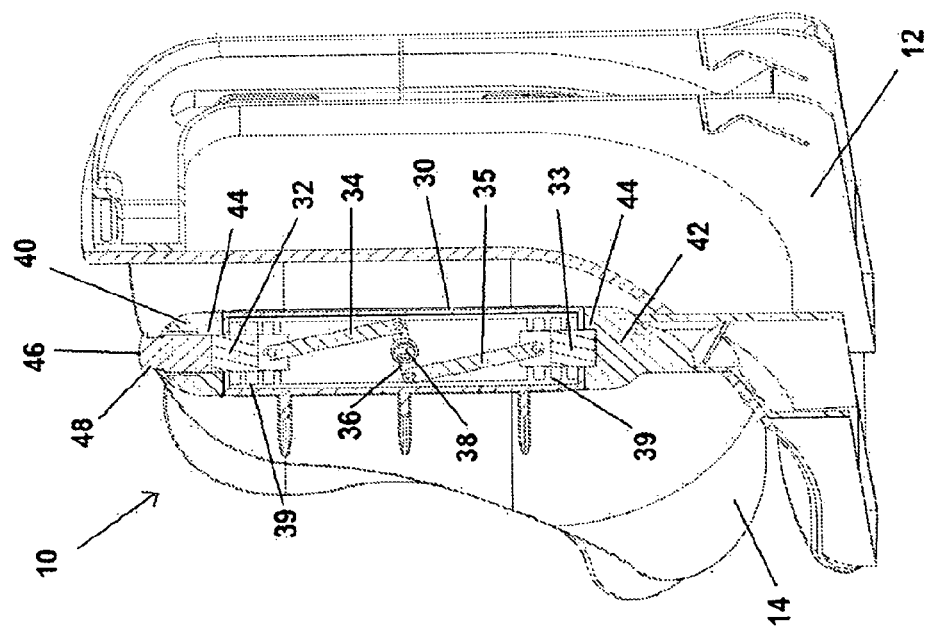

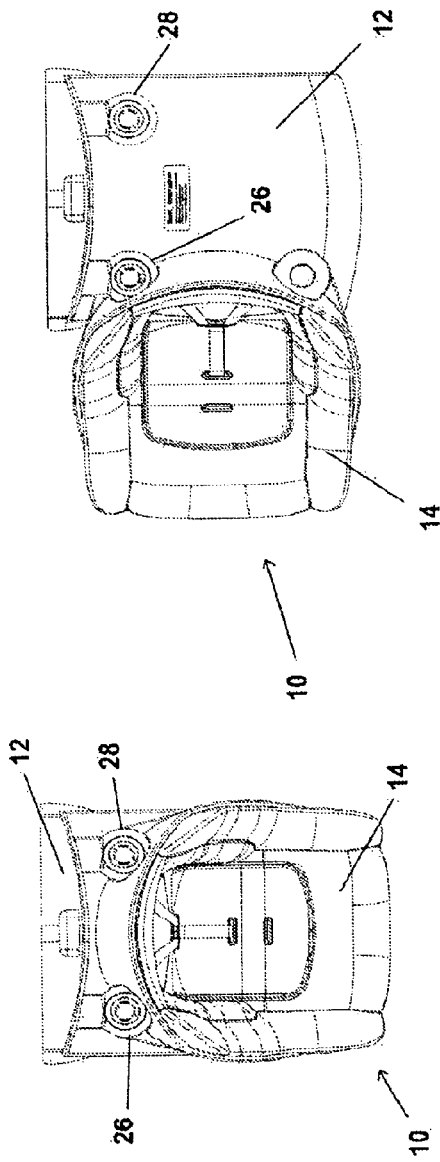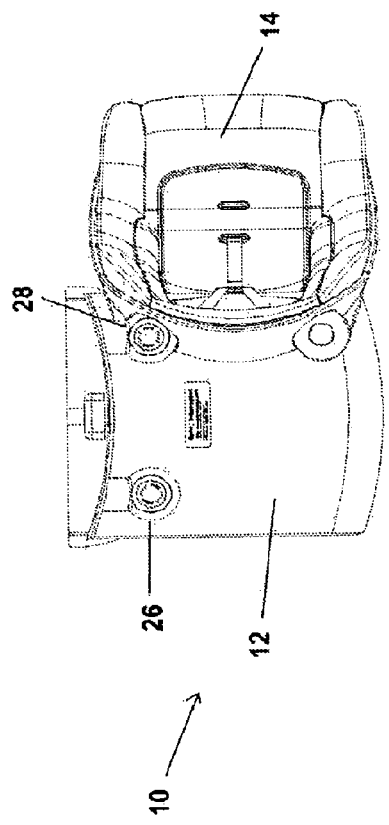

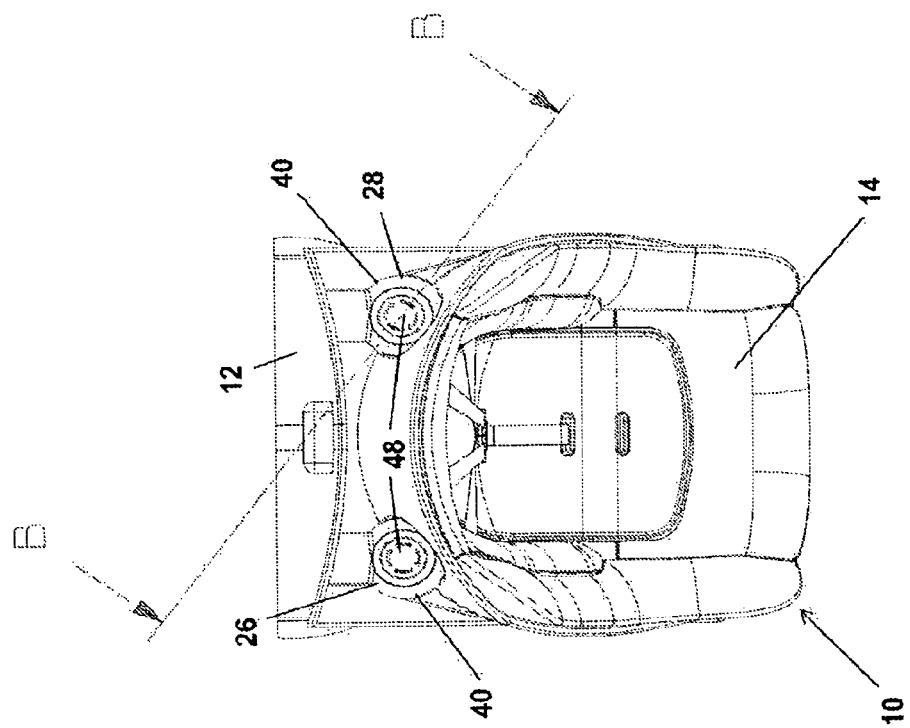
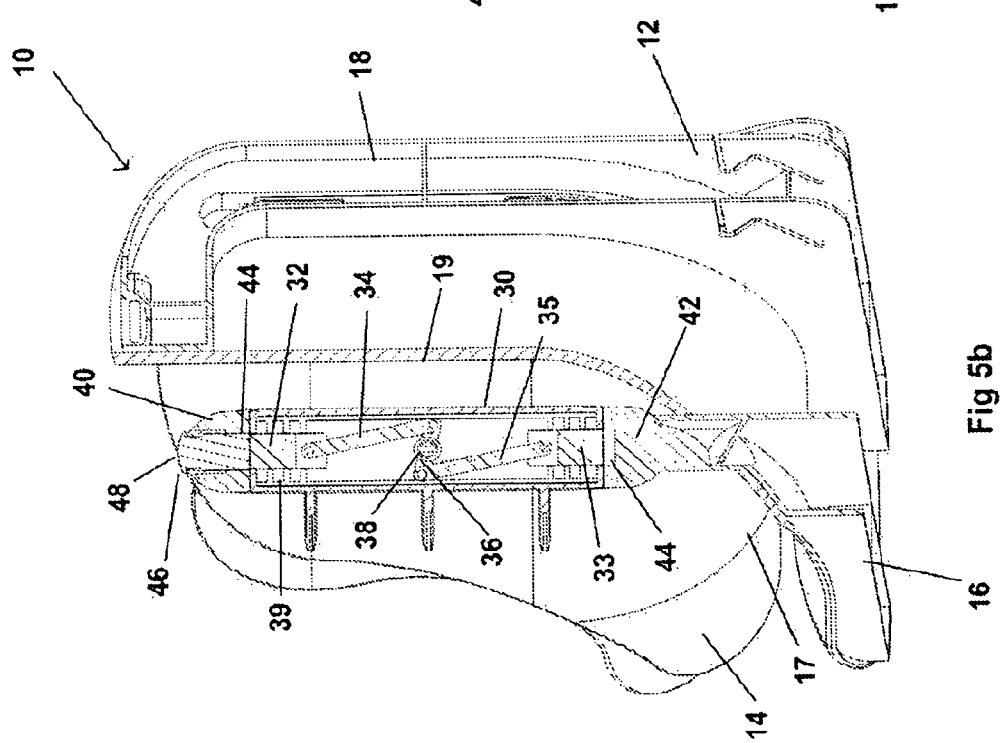

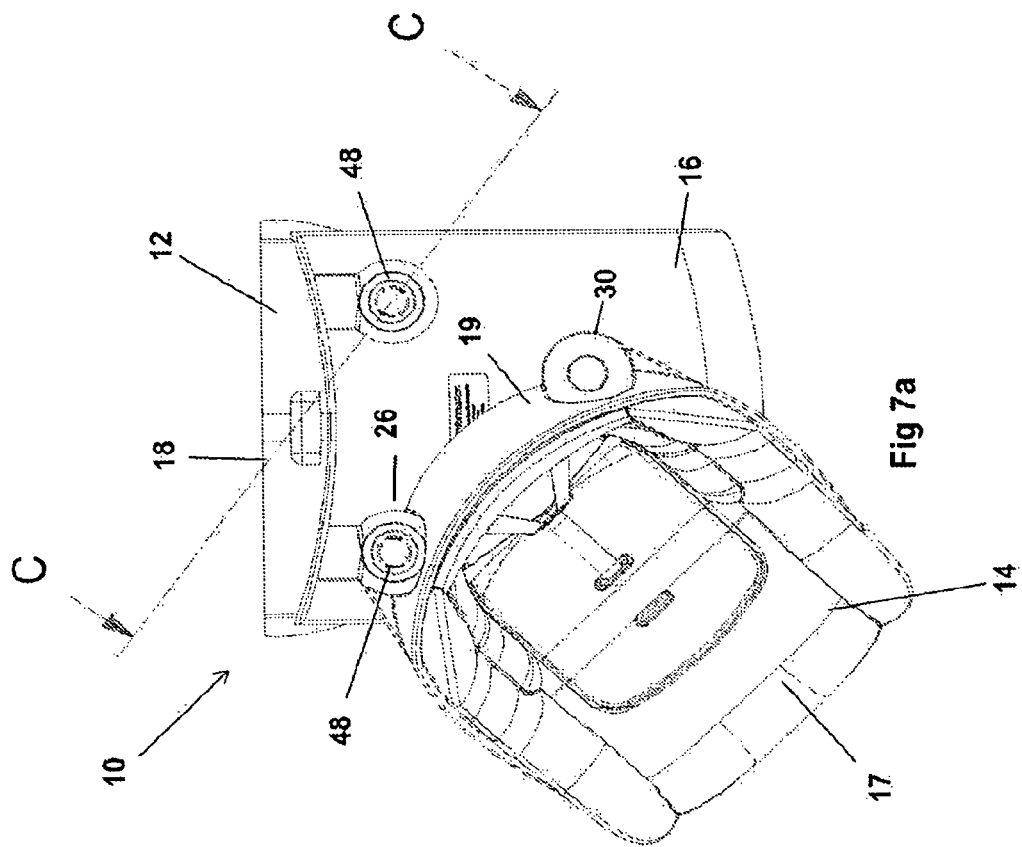
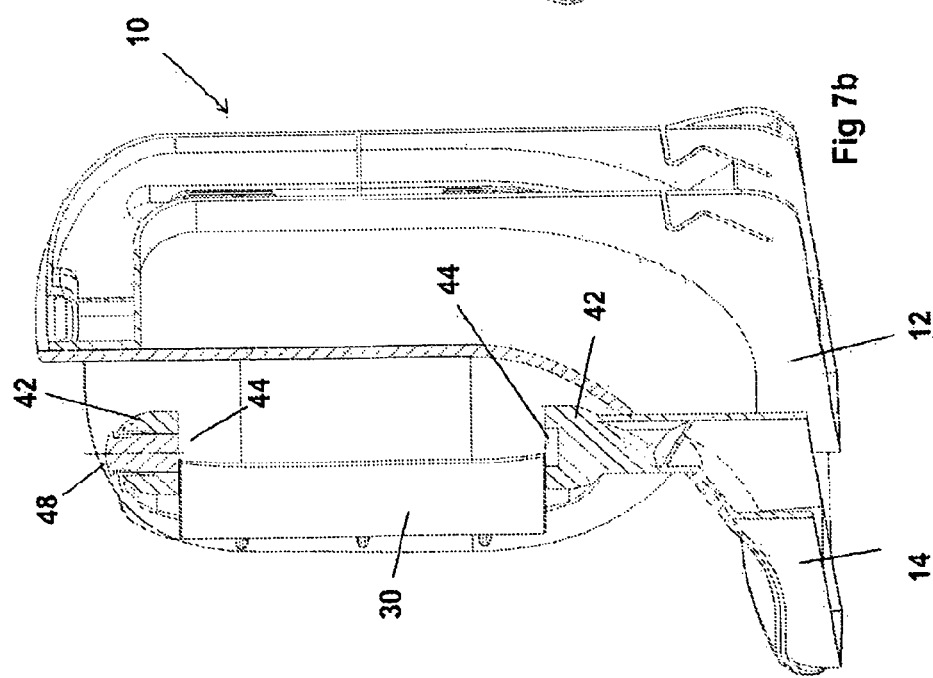

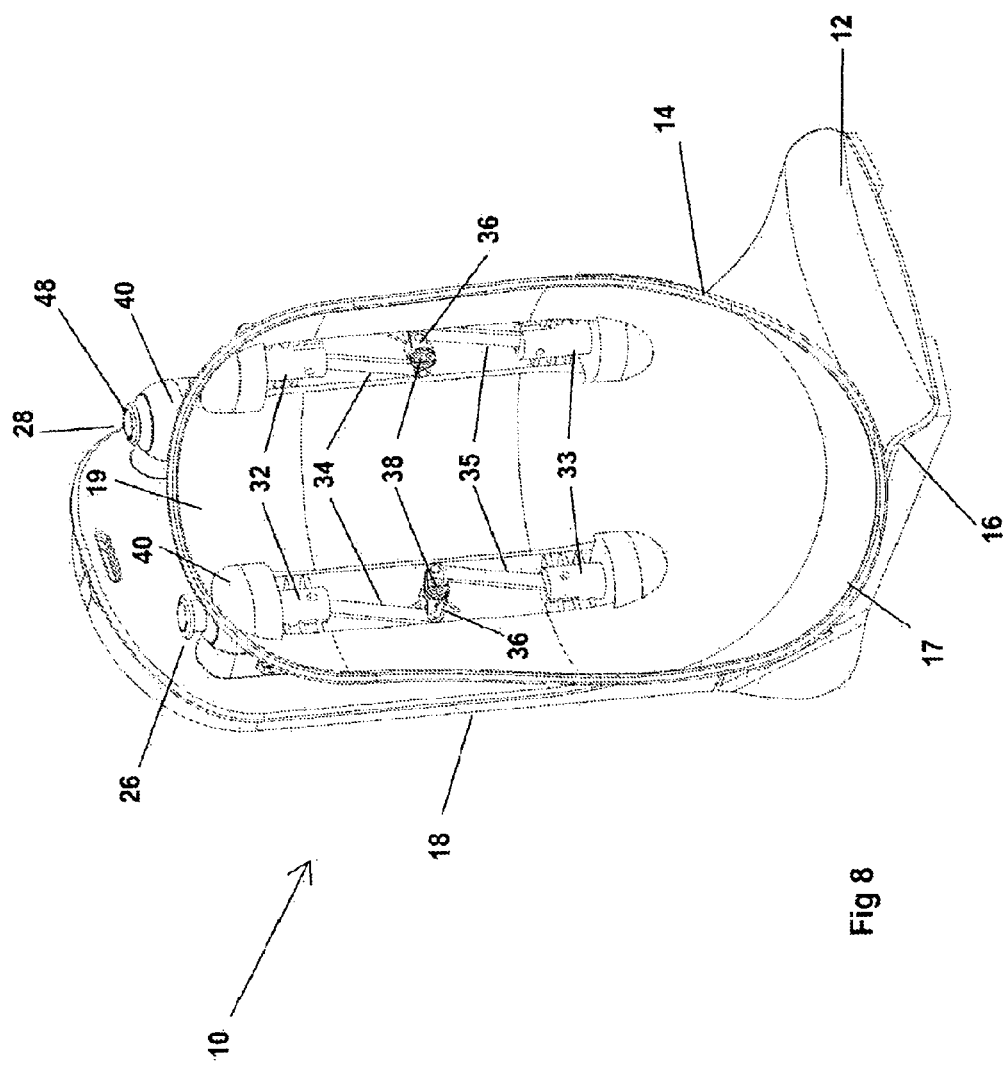

PIVOTABLE INFANT CAR SEAT

RELATED APPLICATIONS

This is the U.S. national stage application which claims priority under 35 U.S.C. §371 to International Patent Application No.: PCT/AU2010/001748, filed on Dec. 24, 2010, which claims priority to Australian Patent Application No. 2010/900014, filed on Jan. 4, 2010, the disclosures of which are incorporated by reference herein their entireties.

FIELD OF THE INVENTION

The present invention relates to car seat for infants and children.

BACKGROUND TO THE INVENTION

Children must generally be seated in a specifically designed car seat until they are large enough to sit in a standard seat. Such seats generally have a harness type belt arrangement that is engaged in a clip located front of the child. While child seats provide increased safety in the case of an accident, placing the child in the car seat and fitting the harness into place can be difficult as it is required to reach across to the front of the child to operate the harness and clip. It is particularly difficult in the case when the car seat is located in the centre rear seat.

The present invention relates to a car seat aimed at overcoming, at least in part, the abovementioned difficulties encountered securing a child in a car seat.

SUMMARY OF THE INVENTION

According to one aspect of the present invention there is provide a car seat comprising:
  a base unit securable to the seat of a car;
  a seat unit mounted to the base unit;
  a first pivot mechanism adjacent a first side of the car seat comprising a first portion connected to the seat unit and a second portion connected to the base unit, the first portion being pivotally secured to the second portion such that the seat unit is pivotable about the base unit;
  a second pivot mechanism adjacent a second side of the car seat comprising a first portion connected to the seat unit and a second portion connected to the base unit, the first portion being pivotally secured to the second portion such that the seat unit is pivotable about the base unit; and
  a release mechanism provided on each of the first and second pivot mechanisms to disengage the first portion of the pivot mechanism from the second portion of the pivot mechanism;
  wherein when the first portion of the first pivot mechanism is disengaged from the second portion of the first pivot mechanism, the seat unit pivots relative to the base unit about the second pivot mechanism and when the first portion of the second pivot mechanism is disengaged from the second portion of the second pivot mechanism, the seat unit pivots relative to the base unit about the first pivot mechanism Preferably the base unit and seat unit each comprises a base wall and a rear wall wherein the first pivot mechanism connects the rear wall of the base unit to the rear wall of the seat unit adjacent a first side thereof and the second pivot mechanism connects the rear wall of the base unit to the rear wall of the seat unit adjacent a second side thereof.

Preferably the first and second pivot mechanisms each allow the seat unit to pivot relative to the base unit about a vertical axis.

In a preferred embodiment, the first portion of each of the first and second pivot mechanisms comprises a cylinder oriented vertically and the second portion of each of the first and second pivot mechanisms comprises an upper end member located above the cylinder and a lower end member located below the cylinder, wherein the upper and lower members are releasably engageable with the cylinder.

Preferably, each of the first and second pivot mechanisms further comprises: a first piston within the cylinder adjacent an upper end thereof;
  a second piston within the cylinder adjacent a lower end thereof;
  apertures in upper and lower ends of the cylinders; and
  recesses in the upper and lower end members;
  wherein the pistons are each moveable between an extended position in which the pistons extend through the apertures into the recesses in the upper and lower end members and a retracted position in which the pistons are retracted into the cylinder.

In one embodiment, each of the upper and lower end members comprises a cylindrical member of the same diameter as the cylinder and located coaxially with the cylinder. Preferably the recesses in the upper and lower end members are provided in ends thereof adjacent the cylinder.

In one embodiment, the first piston is connected to a first end of a first arm member, the second piston is connected to a first end of a second arm member and the second ends of the first and second arm members are each connected to an end of an interconnecting member mounted on a pivot pin adjacent the midpoint of the cylinder such that movement of the first piston either inwardly or outwardly relative to the cylinder results in corresponding movement of the second piston.

Preferably the release mechanism comprises an actuator provided on the upper end member to push the first cylinder from the extended position to the retracted position. The actuator preferably comprises a button having an upper end accessible above the upper end member and a lower end received into the recess.

In one embodiment, the button is rotatable between a locked position in which the button cannot be depressed and an unlocked position in which the button can be depressed to engage the first piston. The button may include ribs on the sides thereof receivable in corresponding grooves in the recess such that the button may only be depressed downwardly into the recess when the ribs are aligned with the grooves.

Preferably the pistons are spring biased to move towards the extended positions thereof.

In a preferred embodiment, the first and second pistons include one or more guide flanges extending radially from the sides thereof to engage with an inner surface of the cylinder to guide the pistons into the apertures in the ends of the cylinder.

Preferably the end members include angled edges adjacent the recesses such that when the seat unit is rotated back to the forward facing position, the pistons engage with the angled edges pushing the pistons back to the retracted positions.

BRIEF DESCRIPTION OF THE DRAWINGS

The invention will now be described, by way of example, with reference to the following drawings in which.

FIG. 2a is a top view of the car seat of FIG. 1 with the seat unit secured in a forward facing position;

FIG. 2b is a cross sectional view of the car seat of FIG. 2a through the line A-A;

FIG. 4a is a top view of the car seat of FIG. 1 locked in the forward facing position;

FIG. 4b is a top view of the car seat of FIG. 1 in a left facing position;

FIG. 4c is a top view of the car seat of FIG. 1 in a right facing position;

FIG. 5a is a top view of the car seat of FIG. 1 unlocked in the forward facing position;

FIG. 5b is a cross sectional view of the car seat of FIG. 5a through the line B-B;

FIG. 7a is a top view of the car seat of FIG. 1 rotated to the left facing position;

FIG. 7b is a cross sectional view of the car seat of FIG. 7a through the line C-C; and FIG. 8 is a perspective view of the car seat of FIG. 1 in the left facing position with portions of the seat unit cut away to show the pivot mechanism.

DETAILED DESCRIPTION OF PREFERRED EMBODIMENTS

Figure 1:
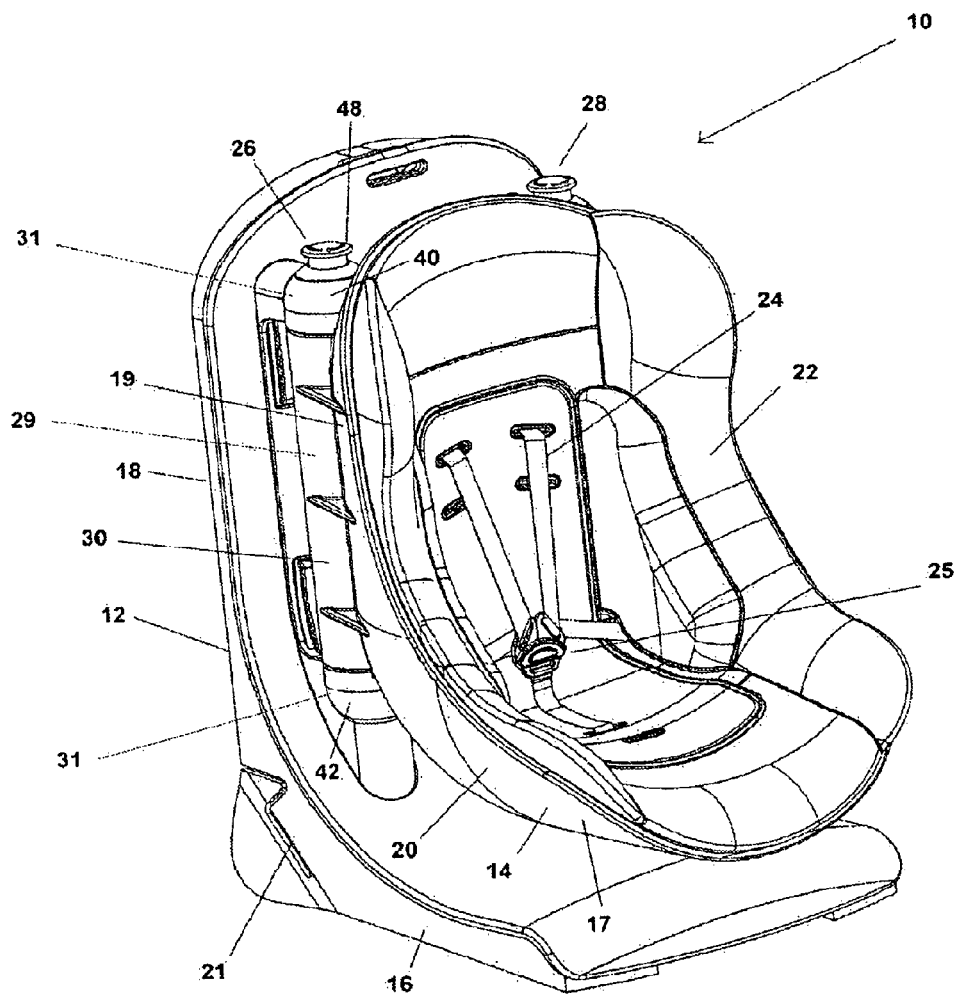
FIG. 1 is an upper perspective view of a car seat in accordance with the present invention.
Figure 3:
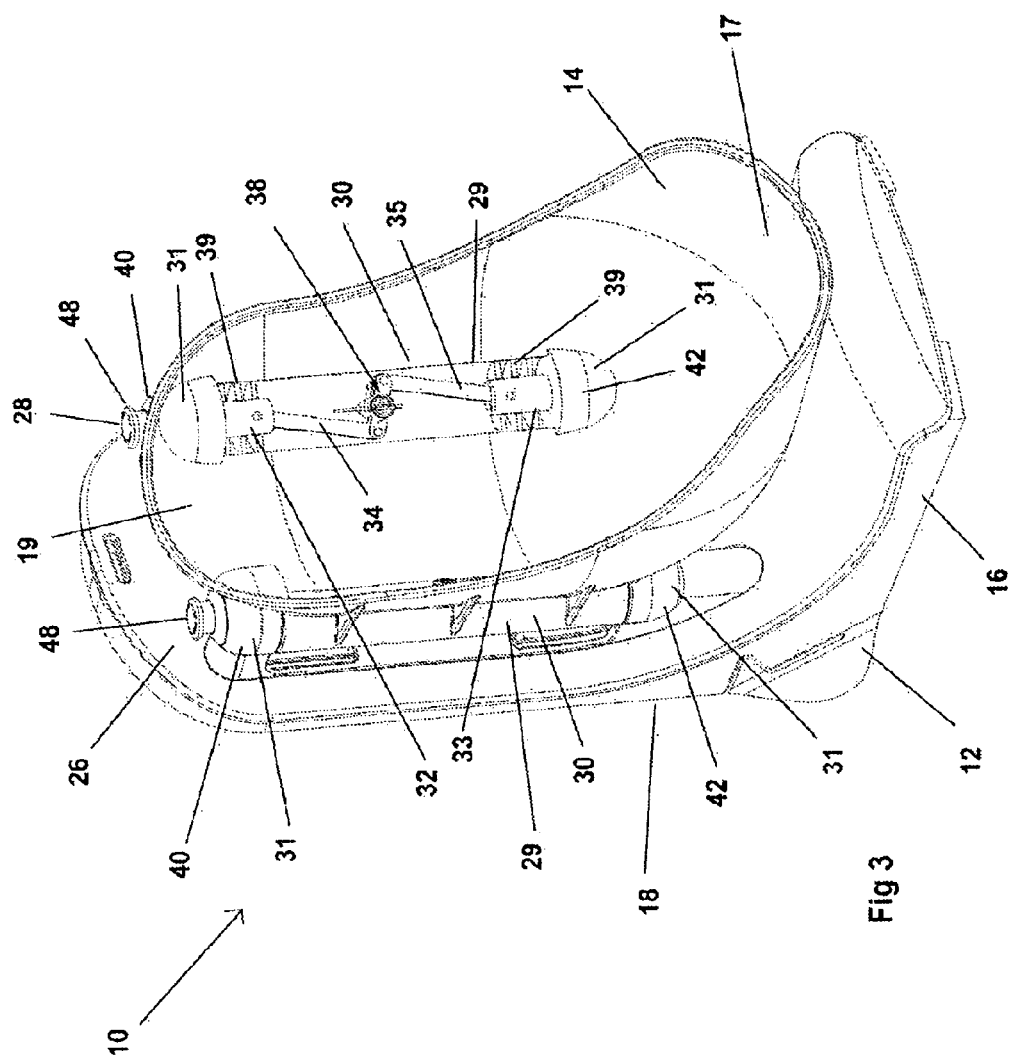
FIG. 3 is a perspective view of the car seat of FIG. 1 in the locked forward facing position with portions of the seat unit cut away to show the pivot mechanism.

Referring to the Figures, there is shown a car seat 10 comprising a base unit 12 and a seat unit 14. The base unit 12 comprises generally a base wall 16 and a rear wall 18. The base wall 16 rests in use on the base of the seat of the vehicle and the rear wall 18 rests against the back of the seat of the vehicle. The base unit 12 is securable to the seat of the vehicle in a known manner. The base unit 12 includes a slot 21 for receiving a seatbelt (not shown) of the vehicle and a further strap (not shown) will be provided for connecting an upper end of the rear wall 18 with a connection point on the vehicle.

The seat unit 12 comprises a capsule type seat into which an infant or small child can be seated. The seat unit 12 includes also a base wall 17 and a rear wall 19. The base wall 17 of the seat unit 14 is located above and generally parallel to the base wall 16 of the base unit 12. The rear wall 19 of the seat unit 14 is located in front of and generally parallel to the rear wall 18 of the base unit 12. The seat unit 14 includes also curved side walls 20 to wrap partially around the side of the child when seated in the seat unit 14 to provide stability against sideways movement.

The seat unit 14 includes padding 22 and a harness 24. The harness 24 is of a known type having a pair of shoulder sashes that pass over each shoulder of the child and connect to a clip 25 in front of the child. The clip 25 is secured to a further strap extending from the base wall 17 of the seat unit 14 up between the legs of the child in use.

The seat unit 14 is pivotally mounted to the base unit 12 such that the seat unit is pivotable from a forward facing position (as shown in FIG. 1) to either a left facing position (as shown in FIG. 4b) or a right facing position (as shown in FIG. 4c). The seat unit 14 is pivotable about axes that are generally vertical and parallel to the rear wall 18 of the base unit 12.

In the forward facing position, the base wall 17 of the seat unit 14 is located above and generally parallel to the base wall 16 of the base unit 12 and the rear wall 19 of the seat unit 14 is located in front of and generally parallel to the rear wall 18 of the base unit 12. The seat unit 14 is lockable in the forward facing position. In the left facing position, the seat unit 14 pivots about a vertical axis such that the seat unit 14 points to the left (when viewed from the front). In the right facing position, the seat unit 14 pivots about a vertical axis such that the seat unit 14 points to the right (when viewed from the front).

The seat unit 14 is provided with a first pivot mechanism 26 connecting the rear wall 18 of the base unit 12 with the rear wall 19 of the seat unit 14 adjacent a first side thereof and a second pivot mechanism 28 connecting the rear wall 18 of the base unit 12 with the rear wall 19 of the seat unit 14 adjacent a second opposite side thereof. The seat unit 14 is pivotally connected to the base unit 14 by both the first and second pivot mechanisms 26 and 28 such that the seat unit 14 can pivot about either of the first or second pivot mechanisms 26 and 28.

The first pivot mechanism 26 comprises a first portion 29 connected to the seat unit 14 and a second portion 31 connected to the base unit 12. The first portion 29 of the first pivot mechanism 26 is pivotally connected to the second portion 31 to provide the pivotal connection between the seat unit 14 and the base unit 12. The second pivot mechanism 28 comprises a first portion 29 connected to the seat unit 14 and a second portion 31 connected to the base unit 12. The first portion 29 of the second pivot mechanism 28 is pivotally connected to the second portion 31 to provide the pivotal connection between the seat unit 14 and the base unit 12.

Each of the first and second pivot mechanisms 26 and 28 includes a release mechanism to disengage the first portion 39 of the pivot mechanism 26 or 28 from the second portion 31 thereof. The release mechanism therefore disconnects the seat unit 14 from the base unit 12 at that pivot mechanism 26 or 28. The seat unit 14 is therefore free to pivot about the first pivot mechanism 26 when the second pivot mechanism 28 is released and free to pivot about the second pivot mechanism 28 when the first pivot mechanism 26 is released.

As shown in FIG. 4, the seat unit 14 can therefore pivot to the left facing position by releasing the second pivot mechanism 28 and pivoting about the first pivot mechanism 26. The seat unit 14 can also pivot to the right facing position by releasing the first pivot mechanism 26 and pivoting about the second pivot mechanism 26. Each of the pivot mechanisms 26 and 28 operates in the same manner as will be described below.

The first portion 29 of each pivot mechanism comprises a cylinder 30 mounted to the rear wall 18 of the seat unit 14. The cylinder 30 includes a first piston 32 adjacent an upper end of the cylinder 30 and a second piston 33 adjacent a lower end of the cylinder 30. The first piston 32 is connected to a first end of a first arm member 34 and the second piston 33 is connected to a first end of a second arm member 35. The second ends of the first and second arm members 34 and 35 are each connected to an end of an interconnecting member 36 adjacent the midpoint of the cylinder 30. The interconnecting member 36 is mounted to a pivot pin 38 extending transversely across the interior of the cylinder 30.

The connection between the first and second pistons 32 and 33 means that movement of the first piston 32 either inwardly or outwardly relative to the cylinder 30 results in corresponding movement inwardly or outwardly of the second piston 33. The upper and lower ends of the cylinder 30 each include an aperture such that the pistons 32 and 33 are each moveable between an extended position in which the piston 32 or 33 extends through the aperture and a retracted position in which the piston is retracted into the cylinder 30.

Each of the pistons 32 and 33 further includes one or more guide flanges 39 extending radially from the sides of the piston 32 and 33. The guide flanges 39 engage with the inner surface of the cylinder 30 to guide the pistons 32 and 33 into the apertures in the ends of the cylinder 30.

The second portion 31 of each pivot mechanism comprises an upper end member 40 located above the upper end of the cylinder 30 and a lower end member 42 located below the lower end of the cylinder 30. Each of the upper and lower end members 40 and 42 extends from the rear wall 18 of the base unit 12.

Each of the upper and lower end members 40 and 42 comprises a cylindrical member of the same diameter as the cylinder 30 located coaxially with the cylinder 30. Each of the upper and lower end members 40 and 42 includes a recess 44 in an end thereof adjacent the cylinder 30. The recesses 44 are provided to receive the pistons 32 and 33 when the pistons 32 and 33 are in the extended positions.

The upper end member 40 also includes an actuator 46 provided in the recess 44 to push the first cylinder 32 from the extended position to the retracted position (thereby also moving the second cylinder 33 from the extended position to the retracted position). The actuator comprises a button 48 having an upper end accessible above the upper end member 40 and a lower end received in the recess 44.

The button 48 includes ribs on the sides thereof receivable in corresponding grooves in the recess 44. The button 48 may only be depressed downwardly into the recess 44 when the ribs are aligned with the grooves. The button 48 is therefore rotatable between a locked position (in which the ribs do not align with the grooves) and an unlocked position (in which ribs do align with the grooves) in which the button 48 can be depressed downwardly.

In use, when the seat unit 12 is locked in the forward facing position, the first and second cylinders 32 and 33 are in the extended positions thereof and received in the recesses 44 of the corresponding end members 40 and 42. A spring bias is provided on the pivot pin 38 to bias the pistons 32 and 33 to the extended positions thereof. In the forward facing position, the cylinders 30 of each of the first and second pivot mechanisms 26 and 28 are thereby secured to the corresponding end members 40 and 42 and the seat unit 14 is not free to pivot.

Figure 6:
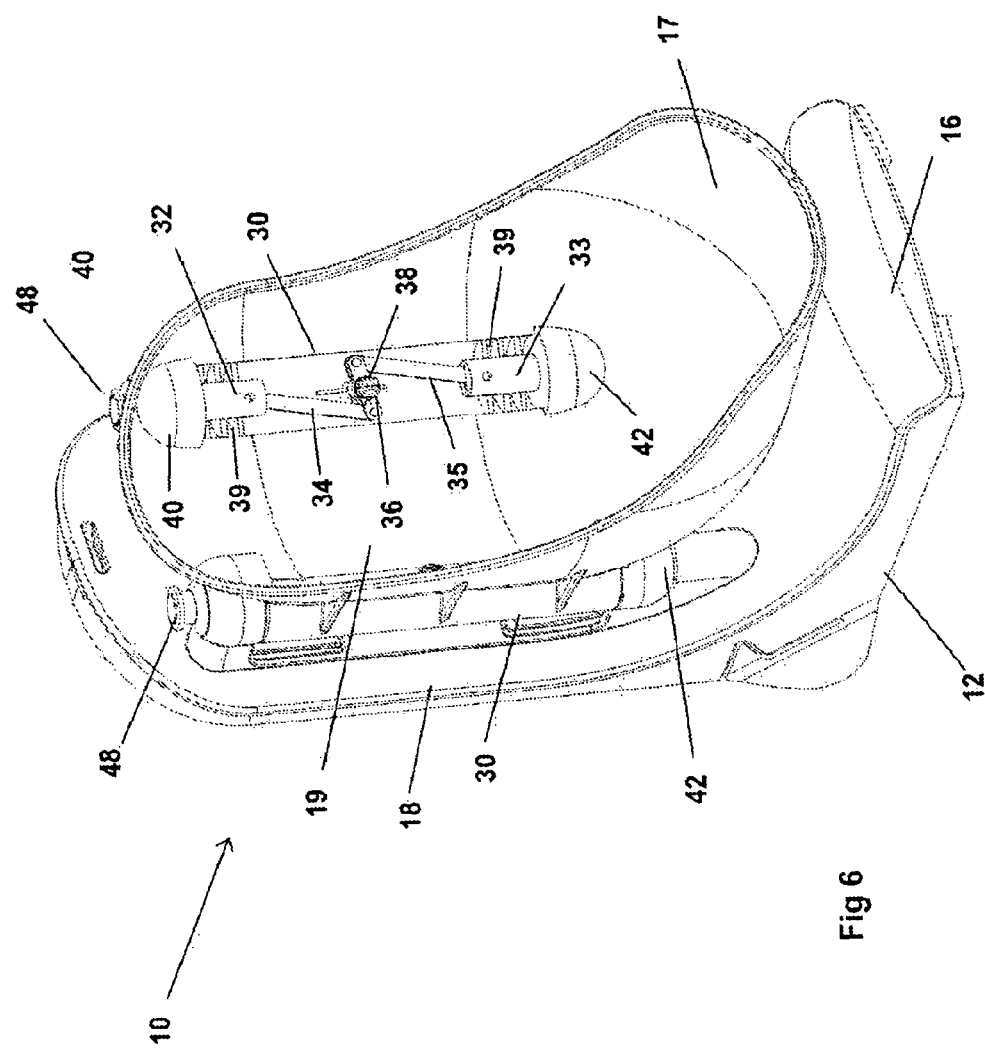
FIG. 6 is a perspective view of the car seat of FIG. 1 in the unlocked forward facing position with portions of the seat unit cut away to show the pivot mechanism.

If it is desired to rotate the seat to the left position (i.e. rotate the seat unit 14 about the first pivot mechanism 26) the button 48 on the second pivot mechanism 28 is rotated to the unlock position and depressed (as can be seen in FIGS. 5 and 6). The pistons 32 and 33 of the cylinder 30 of the second pivot mechanism 28 are thereby pushed to the retracted position and disengage from the end members 40 and 42. The cylinder 30 of the first pivot mechanism 26 can then rotate relative to the end members 40 and 42 by rotation of the pistons 32 and 33 within the respective recesses 44. The seat unit 14 can therefore be pivoted about the first pivot mechanism 26 (rotating about the axis of the cylinder 30) to the left facing position as shown in FIGS. 7 and 8.

The spring bias on the pistons 32 and 33 will cause the disengaged pistons 32 and 33 to move to the extended positions. The end members 40 and 42 include angled edges adjacent the recesses 44 such that when the seat unit 14 is rotated back to the forward facing position, the pistons 32 and 33 engage with the angled edges pushing the pistons 32 and 33 back to the retracted positions. When the pistons 32 and 33 align with the recesses 44, the spring bias pushes the pistons 32 and 33 back to the extended positions to again engage with the end members 40 and 42.

The operation for movement to the right facing position is the same with the button on the first pivot mechanism 26 depressed to disengage the cylinders 32 and 33 and allow pivoting about the second pivot mechanism 28.

In use, when a person is placing a child into the car seat 10 from a rear door of the vehicle, the car seat 10 can be pivoted to either the left facing position or the right facing position so that the car seat 10 is facing the person. Easier access is thereby provided for both placing a child into the car seat 10 and removing the child from the car seat 10.

It will be readily apparent to persons skilled in the relevant arts that various modifications and improvements may be made to the foregoing embodiments, in addition to those already described, without departing from the basic inventive concepts of the present invention.

The invention claimed is:

1. A car seat comprising:
   a base unit securable to the seat of a car;
   a seat unit mounted to the base unit;
   a first pivot mechanism adjacent a first side of the car seat comprising a first portion connected to either the seat unit or the base unit and a second portion connected to the other of the seat unit or the base unit, the first portion being moveable between an extended position in which it is pivotally engaged with the second portion and a retracted position in which it is disengaged from the second portion;
   a second pivot mechanism adjacent a second side of the car seat comprising a first portion connected to either the seat unit or the base unit and a second portion connected to the other of the seat unit or the base unit, the first portion being moveable between an extended position in which it is pivotally engaged with the second portion and a retracted position in which it is disengaged from the second portion; and
   a release mechanism provided on each of the first and second pivot mechanisms to move the first portion thereof to the retracted position;
   wherein when the first portion of the first pivot mechanism is in the retracted position, the seat unit pivots relative to the base unit about the second pivot mechanism and when the first portion of the second pivot mechanism is in the retracted position, the seat unit pivots relative to the base unit about the first pivot mechanism.

2. A car seat in accordance with claim 1, wherein the base unit and seat unit each comprises a base wall and a rear wall wherein the first pivot mechanism connects the rear wall of the base unit to the rear wall of the seat unit adjacent a first side thereof and the second pivot mechanism connects the rear wall of the base unit to the rear wall of the seat unit adjacent a second side thereof such that the first and second pivot mechanisms each allow the seat unit to pivot relative to the base unit about a vertical axis.

3. A car seat in accordance with claim 1, wherein the first portion of each of the first and second pivot mechanisms comprises a cylinder oriented vertically having a first piston adjacent an upper end and a second piston adjacent a lower end, and the second portion of each of the first and second pivot mechanisms comprises an upper end member located above the cylinder and a lower end member located below the cylinder, wherein the pistons are each moveable between the extended position, in which the pistons are received in recesses in the upper and lower end members, and the retracted position, in which the pistons are retracted within the cylinder.

4. A car seat in accordance with claim 3, wherein each of the upper and lower end members comprises a cylindrical member of the same diameter as the cylinder and located coaxially with the cylinder.

5. A car seat in accordance with claim 4, wherein the recesses in the upper and lower end members are provided in ends thereof adjacent the cylinder.

6. A car seat in accordance with claim 5, wherein the first piston is connected to a first end of a first arm member, the second piston is connected to a first end of a second arm member and the second ends of the first and second arm members are each connected to an end of an interconnecting member mounted on a pivot pin adjacent the midpoint of the cylinder such that movement of the first piston either inwardly or outwardly relative to the cylinder results in corresponding movement of the second piston.

7. A car seat in accordance with claim 6, wherein the release mechanism comprises an actuator provided on the upper end member to push the first cylinder from the extended position to the retracted position.

8. A car seat in accordance with claim 7, wherein the actuator comprises a button having an upper end accessible above the upper end member and a lower end received into the recess.

9. A car seat in accordance with claim 8, wherein the button is rotatable between a locked position in which the button cannot be depressed and an unlocked position in which the button can be depressed to engage the first piston.

10. A car seat in accordance with claim 9, wherein the button includes ribs on the sides thereof receivable in corresponding grooves in the recess such that the button may only be depressed downwardly into the recess when the ribs are aligned with the grooves.

11. A car seat in accordance with claim 10, wherein the pistons are spring biased to move towards the extended positions thereof.

12. A car seat in accordance with claim 3, wherein the first and second pistons include one or more guide flanges extending radially from the sides thereof to engage with an inner surface of the cylinder to guide the pistons into the apertures in the ends of the cylinder.

13. A car seat in accordance with claim 3, wherein the end members include angled edges adjacent the recesses such that when the seat unit is rotated back to the forward facing position, the pistons engage with the angled edges pushing the pistons back to the retracted positions.

* * * * *